United States Patent [19]

Poirier

[11] Patent Number: 4,600,501

[45] Date of Patent: Jul. 15, 1986

[54] PROCESS FOR BREAKING EMULSIONS PRODUCED DURING RECOVERY OF BITUMENS AND HEAVY OILS

[75] Inventor: Marc-Andre Poirier, Ottawa, Canada

[73] Assignee: Her Majesty the Queen in right of Canada, as represented by the Minister of Energy, Mines and Resources, Ottawa, Canada

[21] Appl. No.: 659,761

[22] Filed: Oct. 11, 1984

[30] Foreign Application Priority Data

Nov. 22, 1983 [CA] Canada ................... 441680

[51] Int. Cl.$^4$ ................ C10G 33/00; C10G 33/04
[52] U.S. Cl. ................. 208/188; 208/177; 44/24; 44/23; 210/708
[58] Field of Search ............. 208/188, 177; 44/24, 44/23; 210/708

[56] References Cited

U.S. PATENT DOCUMENTS

| | | | |
|---|---|---|---|
| 1,198,039 | 9/1916 | Krause | 210/680 |
| 1,472,385 | 10/1923 | Brown. | |
| 1,911,839 | 5/1933 | Meinzer. | |
| 1,974,692 | 9/1934 | Robinson | 196/4 |
| 1,987,870 | 1/1935 | Robinson | 196/4 |
| 2,789,083 | 4/1957 | Hardy | 210/708 |
| 3,242,097 | 3/1966 | Crawford | 252/325 |
| 3,268,456 | 8/1966 | Fruth | 208/188 |
| 3,272,742 | 9/1966 | Polishuk | 208/188 |
| 3,296,117 | 1/1967 | Ross et al. | 208/188 |
| 3,446,731 | 5/1969 | Harsh | 210/43 |
| 3,528,284 | 9/1970 | Skoglund et al. | 73/104 |
| 4,098,583 | 7/1978 | Tippmer | 44/1 B |
| 4,153,419 | 5/1979 | Clayfield et al. | 44/24 |
| 4,417,976 | 11/1983 | Sander et al. | 208/188 |
| 4,455,148 | 6/1984 | Nagata et al. | 44/1 SR |

*Primary Examiner*—Andrew H. Metz
*Assistant Examiner*—Helane Myers
*Attorney, Agent, or Firm*—Finnegan, Henderson, Farabow, Garrett & Dunner

[57] ABSTRACT

A process for breaking oil-in-water emulsions formed during recovery of bitumen or heavy oil. It comprises contacting the emulsion with a high ash particulate agent selected from high ash coal rejects, fly ash from coking gas and red mud from the production of alumina.

5 Claims, No Drawings

PROCESS FOR BREAKING EMULSIONS PRODUCED DURING RECOVERY OF BITUMENS AND HEAVY OILS

This invention relates to a process for breaking emulsions formed during the recovery of bitumen or heavy oil.

Vast reserves of bitumen and heavy oils are to be found in Western Canada and in-situ recovery of these materials frequently involves techniques such as steam flooding, polymer flooding, alkaline flooding, etc. which tend to produce large amounts of stable emulsions. These stable emulsions represent a serious problem in the recovery of bitumen and heavy oil.

Many attempts have been made over the years to find simple techniques to break these oil-in-water emulsions. Surfactants are commonly used in in-situ recovery processes. However, surfactants can lead to undesirable complications such as incomplete separation and restabilization of emulsions. Also, they are not usually sufficiently biodegradable for release into the environment. When surfactants are used, further treatment of the water is frequently needed for recycling into the process or for releasing through the environment.

It is essential that the emulsions be broken in order to recover additional oil and also so that the water of the emulsion will meet boiler water specifications for reutilization in the process.

U.S. Pat. No. 1,987,870 describes a variety of solid agents which may be used for the treatment of oil-in-water emulsions and mentions fine sawdust, cork dust, coke dust, coal dust (preferably cannel coal), etc.

U.S. Pat. No. 3,446,731 mentions the use of fly ash as a coagulant for particulate materials suspended in an aqueous medium, but points out that fly ash by itself has rather poor coagulating properties and is only effective when used with iron and aluminum hydroxides.

It is the object of the present invention to find an inexpensive but effective material for breaking stable oil-in-water emulsions.

In accordance with the present invention it has surprisingly been found that stable oil-in-water emulsions from bitumen or heavy oil recovery can be broken by contacting the emulsion with certain selected particulate high ash content materials. The particular high ash materials which have been found to be effective are high ash coal rejects, fly ash from coking gas and Red mud. Typically, the particle sizes are less than 60 mesh (250μ) (Canada standard sieve).

Red mud is a residue which occurs when bauxite is dissolved in caustic soda at high temperatures to produce alumina as a raw material for the electrolytic production of aluminum. A typical Red mud may contain as much as 85% be weight ash and in dry form has a quite large surface area. A typical high ash coal reject may contain 60% by weight or more by ash.

The particulate emulsion breaking material is a sorbent and it is preferably retained as a filter bed in an extraction column. The emulsion to be treated is flowed through the column in an upward or downward direction and is contacted with the sorbent until the water is substantially colorless. Depending on the contact time required, a plurality of columns may be arranged in series as a continuous flow system or a batch quantity of emulsion may be recycled through a column or columns until the water is substantially colorless.

The emulsion breaking materials used according to this invention are all very cheap materials and are, in fact, largely industrial wastes. As a consequence, after recovering the oil that is absorbed, it is not necessary to try to regenerate the emulsion breaking material and it can be dumped as waste material.

This invention can be more easily understood from a study of the following examples.

EXAMPLE I a. Emulsions Tested

Two oil-in-water emulsions were used for these investigations, with Emulsion A being a synthetic emulsion prepared by homogenizing in a blender 9.5 parts Athabasca bitumen, 90 parts water and 0.5 part of sodium oleate. Emulsion B was a commercial emulsion obtained from a Texaco pilot operation at Fort McMurray where in-situ recovery methods were being tested.

b. Emulsion Breaking Materials

A large number of different particulate materials were tested as agents for breaking oil-in-water emulsions, but only three were found to be effective, these being the red mud, high ash coal rejects and fly ash from coking gas of the present invention. Analyses of the emulsion breaking materials of the present invention are given below.

The high ash coal rejects used was Minto coal rejects having the analysis given below.

TABLE 1

| Analysis of Minto coal rejects | |
|---|---|
| Analysis | Air dried wt % |
| Proximate analysis | |
| Moisture | 1.26 |
| Ash | 61.19 |
| Volatile matter | 19.15 |
| Fixed carbon (by diff.) | 18.40 |
| Ultimate analysis | |
| Carbon | 23.32 |
| Hydrogen | 1.57 |
| Sulphur | 12.08 |
| Nitrogen | 0.29 |
| Ash | 61.19 |
| Oxygen (by diff.) | 1.55 |

The fly ash sample was obtained from bitumen coking at the Great Canadian Oil Sands plant. It had the following analysis:

TABLE 2

| Analysis of fly ash sample | |
|---|---|
| | GCOS fly ash wt % |
| $SiO_2$ | 31.35 |
| $Al_2O_3$ | 17.08 |
| $Fe_2O_3$ | 5.35 |
| $MnO_2$ | 0.08 |
| $TiO_2$ | 5.80 |
| $P_2O_5$ | 0.14 |
| $CaO$ | 1.02 |
| $MgO$ | 0.89 |
| $SO_3$ | 0.78 |
| $Na_2O$ | 0.37 |
| $K_2O$ | 1.25 |
| $NiO$ | 0.92 |
| $V_2O_5$ | 3.08 |
| $MoO_3$ | 0.07 |
| Loss on ignition | 31.82 |

The Red mud was obtained from the Alcan plant at Arvada, Quebec and it had the following analysis:

TABLE 3

| Analysis of Red Mud | |
|---|---|
| Analysis | Air dried wt % |
| Proximate analysis | |
| Moisture | 1.27 |
| Ash | 85.46 |
| Volatile matter | 13.27 |
| Fixed carbon (by diff.) | — |
| $Al_2O_3$ | 10.68* |
| $Na_2O$ | 6.80 |
| CaO | 11.49 |
| $SiO_2$ | 8.94 |
| $Fe_2O_3$ | ~30.0 |

*Total $Al_2O_3$ (22.7%). This includes the above 10.68% together with other less soluble aluminas.

c. Treatment of Emulsions

The test procedure used was to shake in a flask 2 grams of emulsion breaking material with a predetermined volume of emulsion for a period of 3 minutes. The slurry was then percolated through glass wool and the color of the filtrate was compared with distilled water.

The results obtained from the above tests are set out in Table 4 below:

TABLE 4

| Sorbent | Emulsion | pH | Sorbent wt (g) | Volume (mL) emulsion | Observations |
|---|---|---|---|---|---|
| 1. Active carbon | B | — | 2 | 25 | no change |
| 2. Wood ash | B | — | 2 | 25 | clear, amber colour |
| 3. Lignite ash | B | — | 2 | 25 | no change |
| 4. *Glass wool | B | — | — | 25 | no change |
| 5. Sand | A | — | 2 | 25 | no change |
| 6. Sand | B | 1 | 2 | 25 | less dark |
| 7. Sand | B | — | 2 | 25 | no change |
| 8. GCOS ash | A | — | 2 | 50 | colourless |
| 9. Glass wool | A | 1 | — | 25 | oil on top of water |
| 10. Red mud | A | — | 2 | 50 | colourless |
| 11. GCOS ash | B | 1 | 2 | 50 | clear, pale yellow |
| 12. Red mud | B | 1 | 2 | 150 | clear, amber colour |
| 13. GCOS ash | B | 1 | 2 | 100 | clear, pale yellow |
| 14. GCOS ash | A | 1 | 2 | 50 | clear, pale yellow |
| 15. Minto coal reject | B | — | 2 | 25 | colourless |
| 16. GCOS ash | B | — | 2 | 25 | pale amber |
| 17. Red mud | B | — | 2 | 75 | clear amber (limit) |
| 18. GCOS ash | B | — | 2 | 50 | clear amber |
| 19. Spent Red mud | B | — | 2 | 50 | clear amber (limit) |
| 20. Spent GCOS ash | B | — | 2 | 50 | turbid amber |

*This test was used as a blank, since all the test were filtered through glass wool.

The above results indicate the unique properties of the three materials of the present invention. These results also show that acidifying the emulsion to a low pH in the range of 1 to 2 prior to treatment with the emulsion breaking material resulted in an increased capacity. Acidification of the emulsion seems to flocculate a surfactant present in the emulsion which remains with the bitumen. Colourless water samples were obtained in those cases. Even light amber water samples were found to be free of bitumen.

EXAMPLE 2

Using the same procedure as outlined in Example 1, 25 ml of Emulsion B was treated with 1 gram of GCOS fly ash. After percolating the slurry through glass wool, a filtrate was obtained having a clear amber color. The material retained on the glass wool was extracted with 50 ml of benzene and this benzene extract was evaporated to recover 0.97 gram of material. The aqueous layer was acidified with hydrochloric acid to a pH of 1:2 and the colored material in the aqueous layer was extracted with two portions of ethyl acetate. Evaporation of the solvent resulted in about 6.7 mg of residue which could be defined as total organic residue (TOR).

The benzene-extracted spent fly ash (0.9 gram) was heated at 800° C. for 30 minutes and used again for breaking an emulsion. An amber filtrate was obtained which was darker than the previous one.

EXAMPLE 3

The water samples obtained from the most successful tests in Example 1 were analyzed and the results of these analyses are given in Table 5 below:

TABLE 5

| Analysis of the water samples after demulsification | | | | | | | | | | | | | |
|---|---|---|---|---|---|---|---|---|---|---|---|---|---|
| Sample | 2 | 8 | 10 | 11 | 12 | 13 | 14 | 15 | 16 | 17 | 18 | 19 | 20 |
| Suspended solids (mg/L) | 0 | 0 | 0 | 0 | 0 | 0 | 0 | 0 | 0 | 0 | 0 | 0 | 0 |
| Suspended oil (mg/L) | 0 | 0 | 0 | 0 | 0 | 0 | 0 | 0 | 0 | 0 | 0 | 0 | — |
| Total hardness (mg/L) (as $CaCO_3$) | 2 | 834 | 1 | 792 | 837 | 409 | 813 | 261 | 121 | 1558 | 37 | 10 | 34 |
| Total organic carbon (mg/L) (TOC) | 1474 | — | 169 | 120 | 159 | 137 | 121 | 70 | — | — | — | — | — |
| Silica (mg/L) | 1.68 | 7.21 | 0.17 | 11.5 | 31.29 | 7.95 | 6.80 | 3.17 | 0.62 | 6.05 | 1.41 | 1.12 | 3.19 |
| Iron (mg/L) | 0.04 | 80.8 | ND | 76.4 | 4.0 | 40.6 | 58.6 | 740 | ND | 4.33 | ND | 3.70 | 0.67 |
| pH | 11 | 1 | 8 | 1 | 3 | 1 | 1 | 4 | 11 | 3 | 11 | 7 | 7 |

The above results were then compared with the usual specifications for boiler water which were as follows:

| | |
|---|---|
| Total Hardness | < 0.5 mg/L as $CaCO_3$ |
| Silica | < 50 mg/L |
| Oil | < 1 mg/L |
| Total Dissolved Solids (TDS) | < 8000 mg/L |
| Suspended Solids | 0 |
| Iron | < 0.05 mg/L |

It will be seen from the above results that the water samples complied with the boiler specifications except for total hardness and iron content. Both of these are easily reduced by other means. The important consideration is that none of the samples contain any oil.

I claim:

1. A process for breaking stable oil-in-water emulsions formed during recovery of bitumen or heavy oil consisting essentially of contacting the emulsion with a high-ash particulate agent having a particle size less than 60 mesh, containing at least 60% by weight of ash on a dry weight basis and selected from the group consisting of fly ash obtained from the coking of bitumen, Red mud and high ash coal rejects.

2. A process according to claim 1 wherein the particulate agent forms a filter bed in an extraction column.

3. The process of claim 1, wherein the agent is fly ash obtained from the coking of bitumen.

4. The process of claim 1, wherein the agent is Red mud.

5. The process of claim 1, wherein the agent is high ash coal rejects.

* * * * *